US012559104B2

(12) United States Patent　　(10) Patent No.:　US 12,559,104 B2
　　Voigt　　　　　　　　　　　　　(45) Date of Patent:　　　Feb. 24, 2026

(54) METHOD AND DEVICE FOR OPERATING AUTOMATED LONGITUDINAL CONTROL

(71) Applicant: Robert Bosch GmbH, Stuttgart (DE)

(72) Inventor: Yixuan Voigt, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 140 days.

(21) Appl. No.: 18/486,659

(22) Filed: Oct. 13, 2023

(65) Prior Publication Data

US 2024/0140424 A1　　May 2, 2024

(30) Foreign Application Priority Data

Oct. 28, 2022　(DE) ..................... 10 2022 211 448.5

(51) Int. Cl.
　　*B60W 30/16*　　　　(2020.01)
(52) U.S. Cl.
　　CPC ....... *B60W 30/162* (2013.01); *B60W 2552/20* (2020.02); *B60W 2554/408* (2020.02); *B60W 2720/10* (2013.01)
(58) Field of Classification Search
　　CPC ........... B60W 30/162; B60W 2552/20; B60W 2554/408; B60W 30/09; B60W 30/143
　　See application file for complete search history.

(56) References Cited

U.S. PATENT DOCUMENTS

| | | | | |
|---|---|---|---|---|
| 2017/0341652 A1* | 11/2017 | Sugawara | .......... | G08G 1/09626 |
| 2019/0077404 A1* | 3/2019 | Takeda | .............. | B60W 30/0956 |
| 2021/0284142 A1 | 9/2021 | Mine et al. | | |
| 2023/0415749 A1* | 12/2023 | Inaba | .............. | B60W 60/00272 |
| 2024/0375674 A1* | 11/2024 | Kume | ................... | B60K 35/50 |
| 2025/0058799 A1* | 2/2025 | Inaba | ....................... | G08G 1/16 |

FOREIGN PATENT DOCUMENTS

| | | | |
|---|---|---|---|
| DE | 102005023185 A1 | 11/2006 | |
| DE | 102012215093 A1 | 2/2014 | |
| DE | 102013021813 A1 | 6/2015 | |
| DE | 102021206628 A1 | 12/2022 | |
| EP | 3532351 A1 | 9/2019 | |
| WO | 2018080904 A1 | 5/2018 | |

* cited by examiner

*Primary Examiner* — Toya Pettiegrew
(74) *Attorney, Agent, or Firm* — NORTON ROSE FULBRIGHT US LLP

(57) ABSTRACT

A method for operating a driver assistance system for automated longitudinal control of a motor vehicle in a current lane. The method includes: performing automated longitudinal control at a relative maximum speed taking into account a traffic situation in the current lane of the motor vehicle; evaluating a traffic situation in an adjacent lane to the motor vehicle; ascertaining a risk situation for the motor vehicle taking into account the traffic situation in the adjacent lane; adapting the automated longitudinal control to reduce the risk situation, the adaptation involving reducing the relative maximum speed. A device configured to carry out the method, and a corresponding computer program are also described.

11 Claims, 7 Drawing Sheets

METHOD AND DEVICE FOR OPERATING AUTOMATED LONGITUDINAL CONTROL

CROSS REFERENCE

The present application claims the benefit under 35 U.S.C. § 119 of German Patent Application No. DE 10 2022 211 448.5 filed on Oct. 28, 2022, which is expressly incorporated herein by reference in its entirety.

FIELD

The present invention relates to a method for operating a driver assistance system for automated longitudinal control of a motor vehicle in a current lane, which is characterized by the method steps of: performing automated longitudinal control at a relative maximum speed taking into account a traffic situation in the current lane of the motor vehicle; evaluating a traffic situation in an adjacent lane to the motor vehicle; ascertaining a risk situation for the motor vehicle taking into account the traffic situation in the adjacent lane; adapting the automated longitudinal control to resolve the risk situation, the adaptation involving reducing the relative maximum speed. Furthermore, the present invention comprises a device configured to carry out the method, and a corresponding computer program.

BACKGROUND INFORMATION

Automated longitudinal controllers are available in the related art and are also called adaptive cruise control (ACC). In ACC, the speed of the motor vehicle is adjusted to a maximum speed, for example. The maximum speed is reduced when, for example, a road user is driving more slowly in the lane in front of the vehicle and the distance between them has fallen below a safety distance. The lateral control is undertaken by the driver in this case.

Construction zone assist systems are also available in the related art. By way of example, the Bosch construction zone assist system is an enhancement of a lane keeping assist system and assists the driver in maintaining a lateral safety distance from vehicles in the adjacent lane and from guard rails when driving in narrow lanes. In addition, the video sensor measures the empty space in front of the vehicle. In this way, when a driver is driving through a construction zone on freeways, the construction zone assist system can warn them in good time of a narrowing in the road if the vehicle is too wide for the narrowed lane.

German Patent Application No. DE 10 2005 023 185 A1 describes a lane change assist system for motor vehicles, comprising a monitoring apparatus for monitoring the traffic in front of and behind the vehicle in question, and comprising a decision apparatus for deciding whether it is possible to change lanes safely.

European Patent No. EP 3 532 351 B1 describes methods for controlling a vehicle control system, comprising: identifying a first target in the lane of a host vehicle; receiving an active braking intervention request; identifying a second target in an adjacent lane to the host vehicle; receiving a signal indicative of the host vehicle changing to the adjacent lane toward the second target; and transmitting a second braking signal to control the braking action at a second braking level in response to the host vehicle moving toward the second target.

SUMMARY

A method according to the present invention advantageously facilitates safe automated (or partially automated)

control of a motor vehicle, in particular on multi-lane roads. This method lowers the risk of an accident in particular. Furthermore, the described function gives the driver a greater feeling of safety and makes them feel as if their self-driving (or partially self-driving) vehicle is "thinking for itself". This results in increased user acceptance, which in turn results in more frequent use and thus in greater ease of operation for the driver and a reduced likelihood of accidents occurring. This is made possible according to the present invention by the features disclosed herein. Further embodiments of the present invention are disclosed herein.

The method according to an example embodiment of the present invention for operating a driver assistance system for automated longitudinal control of a motor vehicle in a current lane is characterized by the method steps of: performing automated longitudinal control at a relative maximum speed taking into account a traffic situation in the current lane of the motor vehicle; evaluating a traffic situation in an adjacent lane to the motor vehicle; ascertaining a risk situation for the motor vehicle taking into account the traffic situation in the adjacent lane; adapting the automated longitudinal control to resolve the risk situation, the adaptation involving reducing the relative maximum speed.

This is understood to be a method for assisting the performance of automated longitudinal control of a motor vehicle (ego motor vehicle) in a first lane. In this case, longitudinal control is understood to be cruise control, taking into account a maximum target speed set by a driver of the ego motor vehicle, for example. The maximum target speed set by the driver can be reduced when taking into account regulatory conditions, where applicable (for example, a speed limit for a current roadway section).

In addition, according to an example embodiment of the present invention, further factors can be taken into account. One of these factors is to be the traffic situation in the motor vehicle's lane (current lane). This is understood such that at least one other road user in this lane is to be taken into account. Depending on the speed of the ego motor vehicle, a defined safety distance results for this ego motor vehicle relative to another vehicle, for example. If the defined safety distance from the other road user cannot be maintained, the speed is reduced by the automated longitudinal control and the appropriate safety distance is set. For example, a vehicle traveling immediately in front in this same lane is used as a reference point for setting the safety distances relative to the ego motor vehicle.

According to an example embodiment of the present invention, the traffic situation in an adjacent lane to the ego motor vehicle is also to be evaluated. "Evaluated" is in particular understood to mean ascertaining and assessing information. An adjacent lane can be understood to be a lane to the right of the current lane or a lane to the left of the current lane, for example. A traffic situation can be understood to be the presence of another road user, for example. This can also include a dynamic driving profile and/or driving direction and/or driving behavior as well as a vehicle profile (for example, vehicle width) and/or kinematically induced movement profiles (following behavior of a truck semitrailer).

According to an example embodiment of the present invention, the ascertained traffic situation in the adjacent lane to the ego motor vehicle is used to assess a resulting risk situation in relation to the ego motor vehicle. A risk situation can be understood to be a future driving situation for the ego motor vehicle in the current lane in which there is a greater risk of an accident, the traffic situation in the adjacent lane, for example driving behavior of the vehicle in the adjacent lane, at least contributing to the risk of the ego motor vehicle being involved in an accident.

On the basis of the ascertained potential risk situation, a decision is made that relates to taking an automated measure to resolve (i.e., to reduce or ideally prevent) the risk of an accident for the future driving situation for the ego motor vehicle. One measure is that of reducing the speed of the ego motor vehicle. Furthermore, the distance from the vehicle traveling in front can be increased. An advantageous adaptation of the automatic longitudinal control also involves a vehicle in front in the adjacent lane additionally being taken into account or exclusively used as a reference point for setting the safety distance relative to the ego motor vehicle.

Hereinafter, the measure decided upon can be implemented, for example continuing the automated longitudinal control while taking into account and/or implementing the measure decided upon. By way of example, the automatic cruise control is continued, but the safety distance is set relative to a vehicle in the adjacent lane.

In an advantageous specific example embodiment of the present invention, the method is characterized in that, for ascertaining the risk situation, at least one of the following method steps is performed: evaluating a passive movement model of the motor vehicle; and/or evaluating an active movement model of the motor vehicle; and/or evaluating a roadway model; and/or evaluating the influence of the traffic situation in the adjacent lane on the traffic situation in the current lane; and/or evaluating coincidence between a risk region and a predicted movement of the motor vehicle in the current lane; and/or evaluating an alternative driving maneuver of the motor vehicle.

As already mentioned, evaluating can in particular be understood to mean ascertaining and assessing information. This information can be ascertained directly by the ego motor vehicle itself, for example from captured data from a video camera, or can be extracted from data material stored in the vehicle or retrieved from a cloud, for example from digital road maps. Assessing can be understood to mean analyzing, and/or taking into account during the analysis, whether there is a risk situation or whether a future risk situation can be expected.

A passive movement model is understood in particular to be a static model of the motor vehicle. A model of this kind is characterized, for example, by the structure and/or dimensions of the motor vehicle (for example, the width of the motor vehicle). A passive movement model can also include a dynamic model of the motor vehicle. A model of this kind is characterized, for example, by the kinematic relationships and conditions in a multi-unit vehicle. As such, a dynamic model comprises, for example, kinematically induced following behavior of a semitrailer or trailer of a truck.

An active movement model is understood in particular to be a dynamic model of the motor vehicle. This can include a current driving profile (in particular speed, acceleration), for example. Furthermore, this can contain a current driving direction or an estimated future movement (driving trajectory). Likewise, driving behavior (for example, a steady and straight-line mode of driving or abrupt steering movements and dynamic changes in speed) of the vehicle can be taken into account. To do this, current driving behavior can be extrapolated or an average of the past driving behavior can be ascertained.

A likely movement of the motor vehicle can be predicted from the active movement model, also taking into account the passive movement model.

A roadway model is understood in particular to be a model of the current environment of the motor vehicle; for example, this can include the current and imminent course of the roadway. Furthermore, this can also contain a width of the current lane and the other available lanes.

In a possible embodiment of the present invention, in the method, for evaluating the traffic situation in the adjacent lane, at least one of the following method steps is performed: evaluating a passive movement model of a vehicle in the adjacent lane; and/or evaluating an active movement model of a vehicle in the adjacent lane.

With regard to the active and passive movement models, reference is made to the above statements, with the difference that, in these method steps, an active or passive movement model of a vehicle in the adjacent lane to the ego motor vehicle is to be ascertained and taken into account. Advantageously, the focus here is on the vehicle in the adjacent lane that is contributing to the ascertained risk situation in relation to the ego motor vehicle in the current lane. By way of example, a truck in the adjacent lane is analyzed. In this case, both the driving trajectory of the truck and its width and physically induced behavior of a potential semitrailer when driving around bends can be taken into account.

In a preferred embodiment of the present invention, the method is characterized in that, for evaluating the influence of the traffic situation in the adjacent lane on the traffic situation in the current lane, at least one of the following method steps is performed: evaluating a potential reduction in the width of the navigable current lane; and/or evaluating a potential lane departure and/or lane change of the vehicle from the adjacent lane into the current lane; and/or evaluating a potential breach of a minimum safety distance by the motor vehicle from a vehicle traveling in front in the current lane.

This is understood to mean that an analysis is carried out as to how the ascertained traffic situation in the adjacent lane could impact the traffic situation in the current lane of the vehicle. This analysis is therefore advantageously carried out taking into account the ascertained results of the traffic situation in the adjacent lane and the current lane. If, for example, it is identified that, in the adjacent lane, a vehicle has specific driving behavior, e.g., is driving on the outer edge of the adjacent lane toward the current lane of the ego motor vehicle, a check can be made as to whether or not the remaining navigable width of the current lane allows said ego motor vehicle to pass safely. By way of example, when the width of the current lane is reduced, as is often the case in a construction zone, it is not possible for the ego motor vehicle to pass safely, whereas it would be possible for said ego motor vehicle to pass safely when the width of the current lane is the regular size. If a possible lane change of a vehicle from the adjacent lane to the current lane is actually predicted, the length that a safety distance would be at that point in time can for example be estimated as a resulting influence. In this case, the assessment of the influence can be related to the predicted point in time of the actual lane change, or to a defined time period thereafter.

In an alternative development of the present invention, the method is characterized in that, for evaluating the coincidence between a risk region and the predicted movement of the motor vehicle in the current lane, at least one of the following method steps is performed: evaluating a static risk region, in particular a specific course of the roadway and/or a defined roadway width; and/or evaluating a dynamic risk region, in particular a predicted region in relation to the motor vehicle in the current lane overtaking a vehicle in the adjacent lane which is at least jointly responsible for the risk situation.

5

6

In a possible specific embodiment of the present invention, the method is characterized in that, for evaluating the alternative driving maneuver of the motor vehicle, a check is made as to whether a lane change maneuver to a different adjacent lane is possible.

This is understood to mean that, when deciding to adapt the longitudinal control, a check is made as to whether a change in the lateral control is a suitable option for improving or preventing the ascertained risk situation for the ego motor vehicle. To do this, it can be ascertained whether the ego motor vehicle changing lane to an alternative lane is possible in terms of structure and/or situation. This can be identified as being possible in terms of structure when there is another lane on the roadway. It can be identified as being possible in terms of situation when the traffic situation in this additional lane allows the ego motor vehicle to change from the current lane to the additional lane at the current time or before the risk region in the current lane is reached.

In a preferred embodiment of the present invention, the method is characterized in that the adaptation involves adjusting the longitudinal control of the motor vehicle in the current lane from being related to a vehicle traveling in front in the current lane to being related to a vehicle in the adjacent lane.

In an alternative embodiment of the present invention, the method is characterized in that the adaptation involves adjusting the longitudinal control of the motor vehicle in the current lane from a safety distance relative to a vehicle traveling in front in the current lane to a safety distance relative to a vehicle in the adjacent lane.

In an advantageous development of the present invention, the method is characterized in that the adaptation involves reducing the relative maximum speed only if the relative maximum speed is higher than the speed of the vehicle in the adjacent lane.

In a possible embodiment of the present invention, the method is characterized in that the adaptation of the automated longitudinal control is configured such that the motor vehicle is prevented from passing a risk region in the current lane, in particular such that said motor vehicle is prevented from entering the risk region and/or is removed from the risk region if it is in the risk region.

In a preferred development of the present invention, the method is characterized by the method steps of: adjusting the relative maximum speed of the motor vehicle after resolving the risk situation; and/or continuing the automated longitudinal control of the motor vehicle in the first lane.

In an alternative specific embodiment of the present invention, the method is characterized in that a motor vehicle driver is informed of an adaptation of the automated longitudinal control to resolve the risk situation.

This is understood to mean that technical arrangements are put in place to inform the driver of the imminent adaptation of the longitudinal control. To do this, data signals are encoded and provided accordingly. By way of the data signals, output devices can be actuated which provide the driver with corresponding information. In the process, the information can be communicated to the driver visually, for example using a display, or, for example, acoustically using voice output. Of course, haptic information such as seat vibrations are also conceivable. In addition to information prior to the actual adaptation, the information can alternatively or additionally be provided during the adaptation in order to explain to the driver the deviation from the set speed, for example.

In an advantageous embodiment of the present invention, the method is characterized in that it is possible for the vehicle driver to influence the adaptation of the automated longitudinal control to resolve the risk situation.

Advantageously, by being informed of the planned adaptation of the longitudinal control in good time, the driver is given the option of preventing it from being performed in an automated manner if they so wish. Preventing the automated adaptation can involve the driver canceling the planned adaptation (for example, by way of a voice command) or overriding the automated adaptation, for example by way of manual acceleration, in order to set a higher speed or to implement a reduced distance from another road user.

The approach presented here further provides a device which is configured to carry out, actuate, or implement the steps of a variant of a method presented here in corresponding apparatuses. The object of the present invention can also be achieved quickly and efficiently using this variant of the present invention in the form of a device.

In the present case, a device can be understood to mean an electrical instrument that processes sensor signals and outputs control and/or data signals on that basis. The device can comprise an interface, which may be configured as hardware and/or software. When configured as hardware, the interfaces may, for example, be part of a system ASIC that includes a range of functions of the device. However, the interfaces may also be separate, integrated circuits or consist at least in part of discrete components. When configured as software, the interfaces may be software modules that are provided on a microcontroller in addition to other software modules, for example.

A device can therefore be an assistance system for automated (or partially automated) longitudinal control, as well as an assistance system for identifying a risk situation for a motor vehicle, or can be an assistance system for assisting the driver by transmitting information for vehicle control. Furthermore, a device can be considered to be: an environment capturing device, in particular a camera or other optical recording device and/or a central or decentralized controller which is configured to control one of said devices or to carry out the described method.

Also advantageous is a computer program product or computer program comprising program code which can be stored on a machine-readable carrier or storage medium, such as a semiconductor memory, a hard-disk memory, or an optical memory, and is used for carrying out, implementing, and/or actuating the steps of the method according to one of the above-described specific embodiments of the present invention, in particular if the program product or program is executed on a computer or a device.

It should be noted that the features that are set out individually in the description can also be combined with one another in any technically viable manner, and demonstrate further embodiments of the present invention. Further features and advantages of the present invention will become clear from the description of exemplary embodiments with reference to the figures.

DETAILED DESCRIPTION OF EXAMPLE EMBODIMENTS

DETAILED DESCRIPTION OF EXAMPLE EMBODIMENTS

Figure 1A:
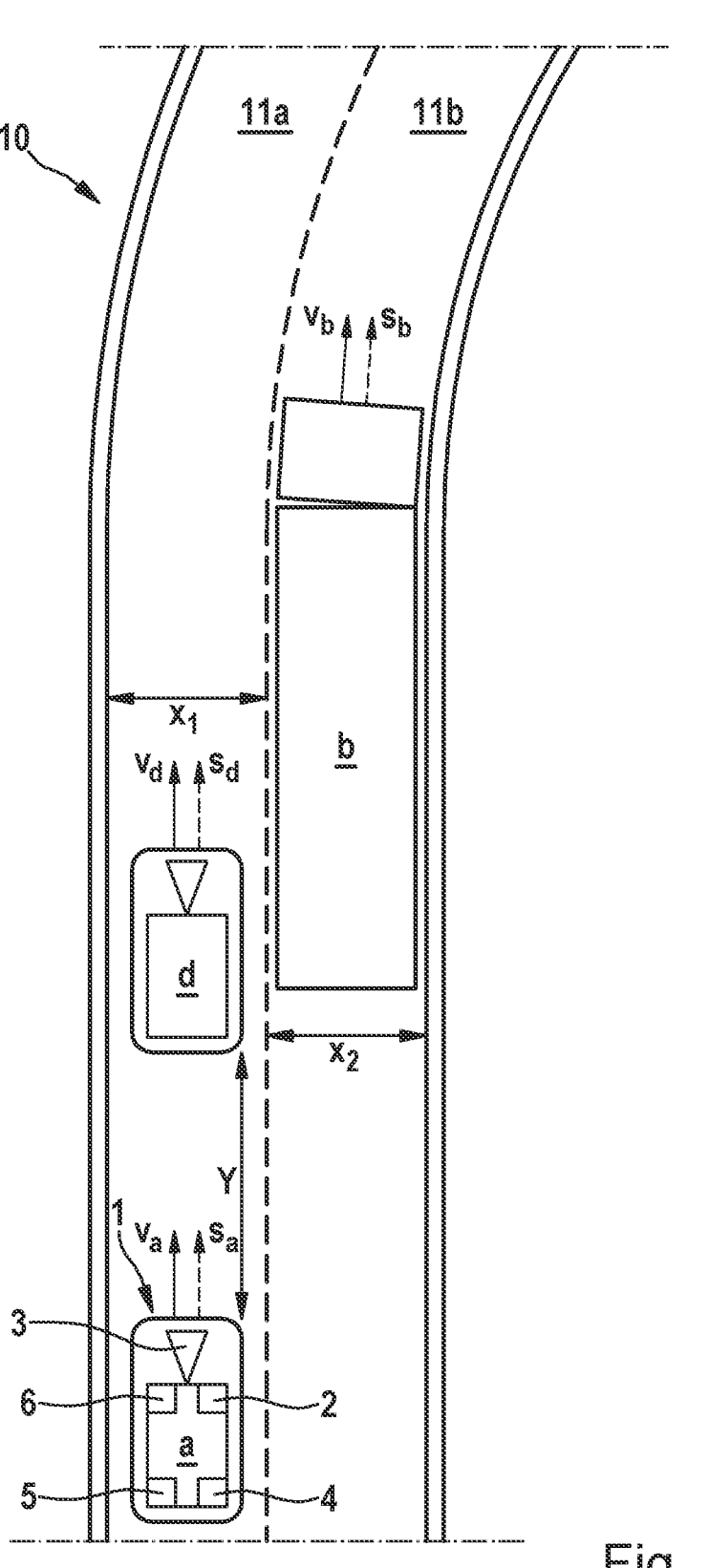
FIGS. 1A-1B are schematic representations of the execution of an example embodiment of the method of the present invention in a specific traffic situation.

FIG. 1A is a schematic representation of an embodiment of the present invention in a first environment and traffic situation. This figure shows a motor vehicle 1 (also called an ego vehicle a) on a roadway 10. Here, the roadway 10 comprises two lanes: a left-hand lane 11a (also called the current lane or first lane) and a right-hand lane 11b (also called the adjacent lane or second lane). The motor vehicle 1 comprises a driver assistance system 2 (also called driving assist) for automated longitudinal control (for example, ACC). This figure also shows a sensor system 3 for capturing the environment, which sensor system comprises a front camera, for example. It goes without saying that further cameras and, alternatively or additionally, radar, LiDAR, or other suitable sensor types can also be used here. The motor vehicle 1 further comprises an arithmetic logic unit 4 (also called the controller) for analyzing the sensor data and/or for carrying out the method and/or for actuating the actuators. The motor vehicle 1 further comprises an actuator system 5, which comprises an actuator for longitudinal control, for example. Furthermore, a device 6 is configured to provide the driver with information. This device can transmit information to the driver in a visual and/or acoustic and/or haptic manner, for example.

In the representation, the motor vehicle 1 moves on the driving trajectory $s_a$ at the speed $V_a$. This is the current relative maximum speed that results from the desired maximum speed set by the driver and from the traffic situation in the current lane. In the traffic situation shown, there is a further vehicle d which is driving in front of the motor vehicle a in the current lane 11a. The vehicle d is driving at a speed $V_d$ which is approximately the same as the speed $V_a$. In this case, the speed V a of the motor vehicle 1 is controlled such that the motor vehicle 1 maintains a defined safety distance Y relative to its own driving speed and the vehicle d in the current lane 11a.

In the traffic situation shown, there is a further vehicle b in the adjacent lane 11b, which is a truck having a semitrailer in this case. In the representation in FIG. 1A, the vehicle b is still outside the safety distance Y of the motor vehicle 1. The vehicle b is driving at the speed $V_b$, which is lower than the speed $V_a$, and therefore the motor vehicle 1 can be expected to overtake the vehicle b. Furthermore, the representation shows a specific course of the roadway, namely an S-shaped bend, as can be found in construction zones. The roadway width $X_1$ for the current lane and $X_2$ for the adjacent lane are also reduced widths, as implemented in construction zones. When taking into account the ascertained roadway profile and the driving profile of the ascertained road user in the adjacent lane, in particular the predicted following behavior of the semitrailer, a likely lane departure of the semitrailer is ascertained. When taking into account the speed of the motor vehicle 1 and the ascertained speed of the vehicle b, a risk region is ascertained which is located in the imminent S-shaped bend. In this risk region, the vehicle b being predicted to come beyond the lane markings influences the driving safety of the motor vehicle 1, since it would then be at the same level as the vehicle b if it drove along without the longitudinal control having been modified. The decision is therefore made to adapt the automated longitudinal control.

Figure 1B:
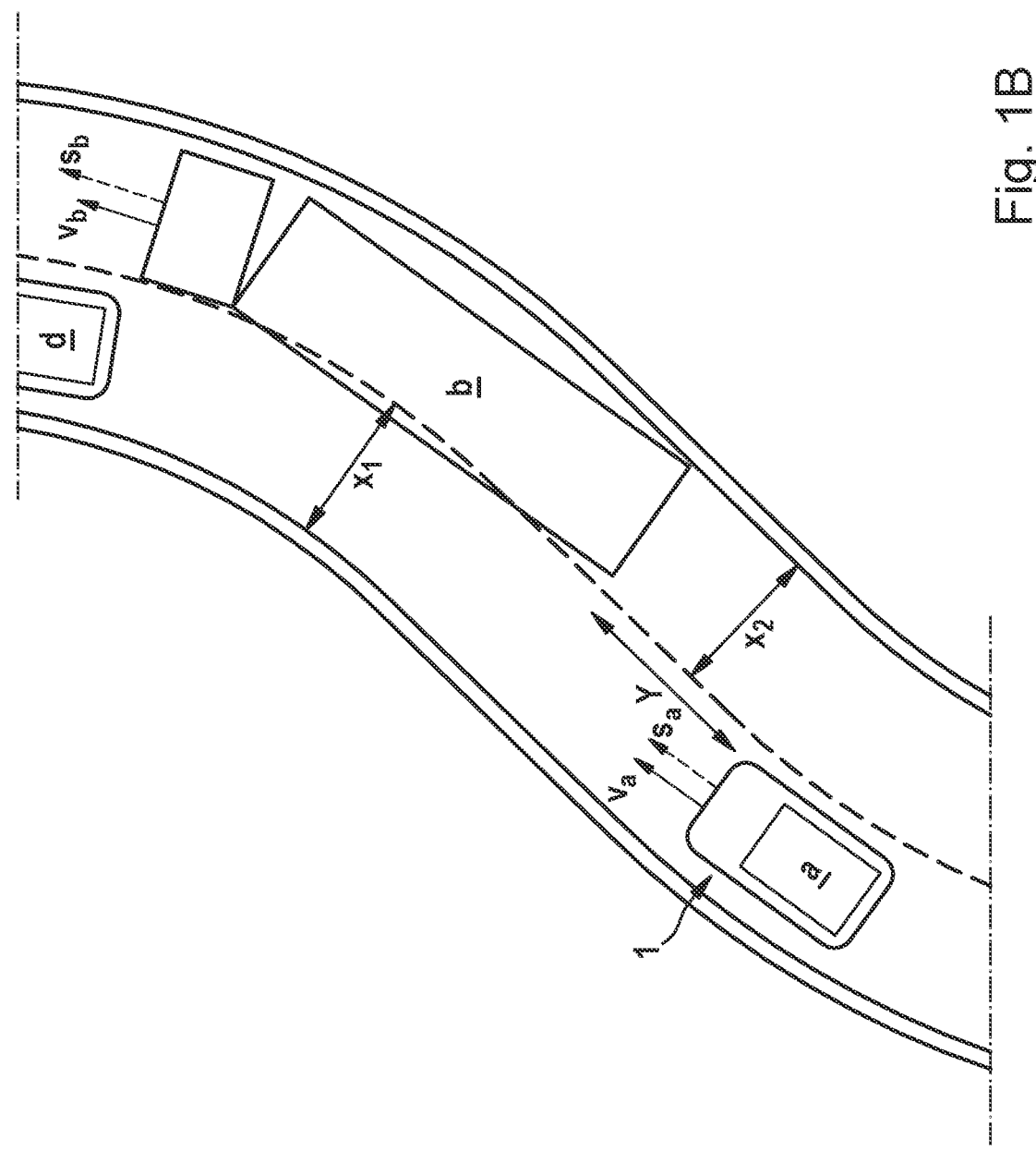

FIG. 1B shows an implementation of the adaptation of the automated longitudinal control that has been decided upon in the continued first environment and traffic situation. The representation shows the same environmental situation as before, but at a later point in time. It clearly shows the S-shaped course of the road. It can also be seen that the semitrailer of the vehicle b coming beyond the lane markings, as was predicted, has actually taken place. However, the automated longitudinal control of the motor vehicle 1 was adapted prior to this, and therefore the motor vehicle 1 avoids the ascertained risk region. To do this, the longitudinal control was modified such that the safety distance of the motor vehicle 1 is no longer ascertained and implemented relative to the other vehicle d in front of the motor vehicle 1 in the current lane 11a, but instead is ascertained and implemented relative to the further vehicle b in front of the motor vehicle 1 in the adjacent lane 11b, in relation to which it has been ascertained that a future risk to the motor vehicle 1 could arise. In this case, the speed V a of the motor vehicle 1 was also accordingly reduced. In the situation shown, the motor vehicle 1 is now driving at the safety distance Y and at approximately the same speed $V_a$ behind the vehicle b, which is driving at the speed $V_b$. This means that the vehicle 1 avoids the ascertained risk region, thus reducing the likelihood of accidents occurring.

Figure 2:
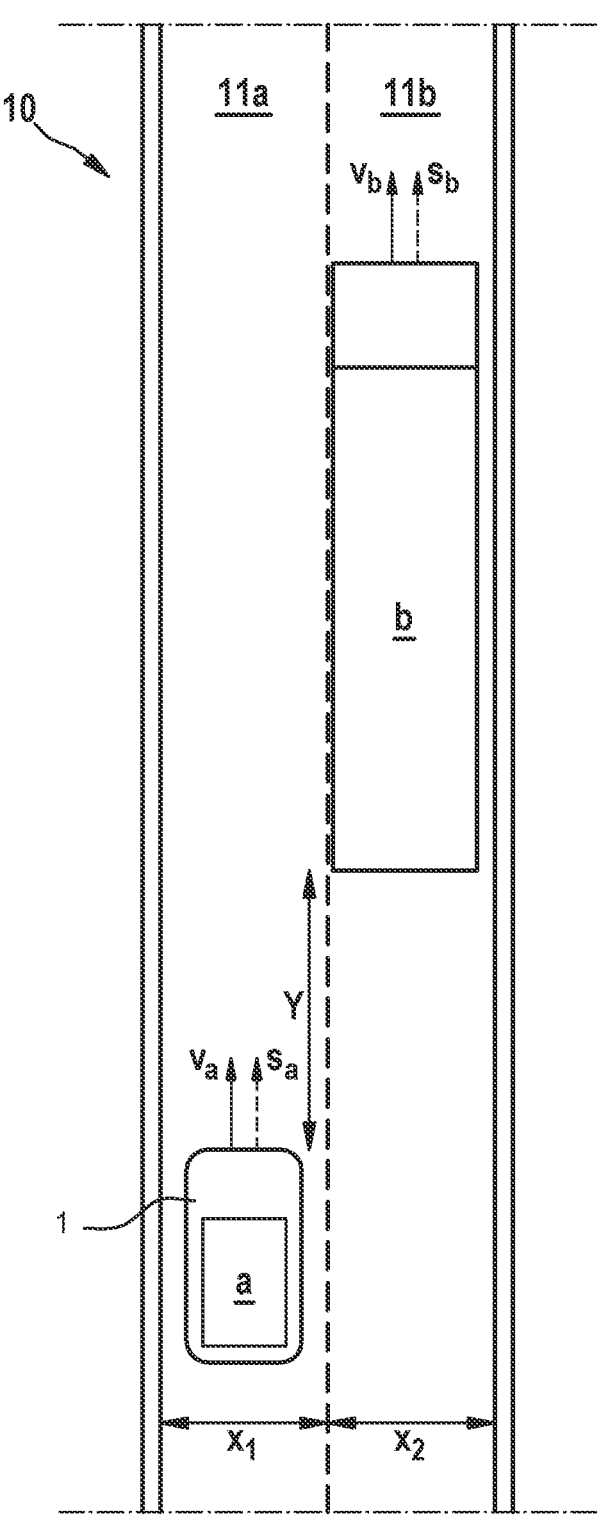
FIGS. 2-5 are representations of an example embodiment of the present invention in alternative traffic situations.

FIG. 2 is a schematic representation of an embodiment of the present invention in a second environment and traffic situation. In the representation, the motor vehicle 1 moves on the driving trajectory $s_a$ at the speed $V_a$. There is no further vehicle in front of the motor vehicle 1 in the current lane 11a, and therefore the motor vehicle could drive at the relative maximum speed. There is a vehicle b in the adjacent lane, which is a truck having a semitrailer. The vehicle b is driving at the speed $V_b$, which is lower than the speed $V_a$, and therefore the motor vehicle 1 can be expected to overtake the vehicle b. Furthermore, the representation shows a specific driving situation, since the roadway width $X_1$ for the current lane and $X_2$ for the adjacent lane have reduced widths, as implemented in construction zones. Furthermore, the vehicle b is driving at the left-hand edge of the right-hand lane 11b, meaning that the navigable width of the left-hand lane 11a is limited further. When taking into account the reduced widths and the vehicle characteristics of the vehicle b in the adjacent lane (in particular the width of the truck) and the driving profile of the vehicle b, a risk situation is ascertained for the motor vehicle 1 potentially overtaking said truck. The decision is therefore again made to adapt the automatic longitudinal control. Although the vehicle b is driving in the adjacent lane 11b, said vehicle is therefore again selected as the reference point for a safety distance Y for the motor vehicle 1. Since the current distance corresponds exactly to the safety distance Y for the current speed of the motor vehicle 1, a reduction in the speed of the motor vehicle 1 needs to be initiated immediately so that the motor vehicle 1 does not enter the risk region.

Figure 3:
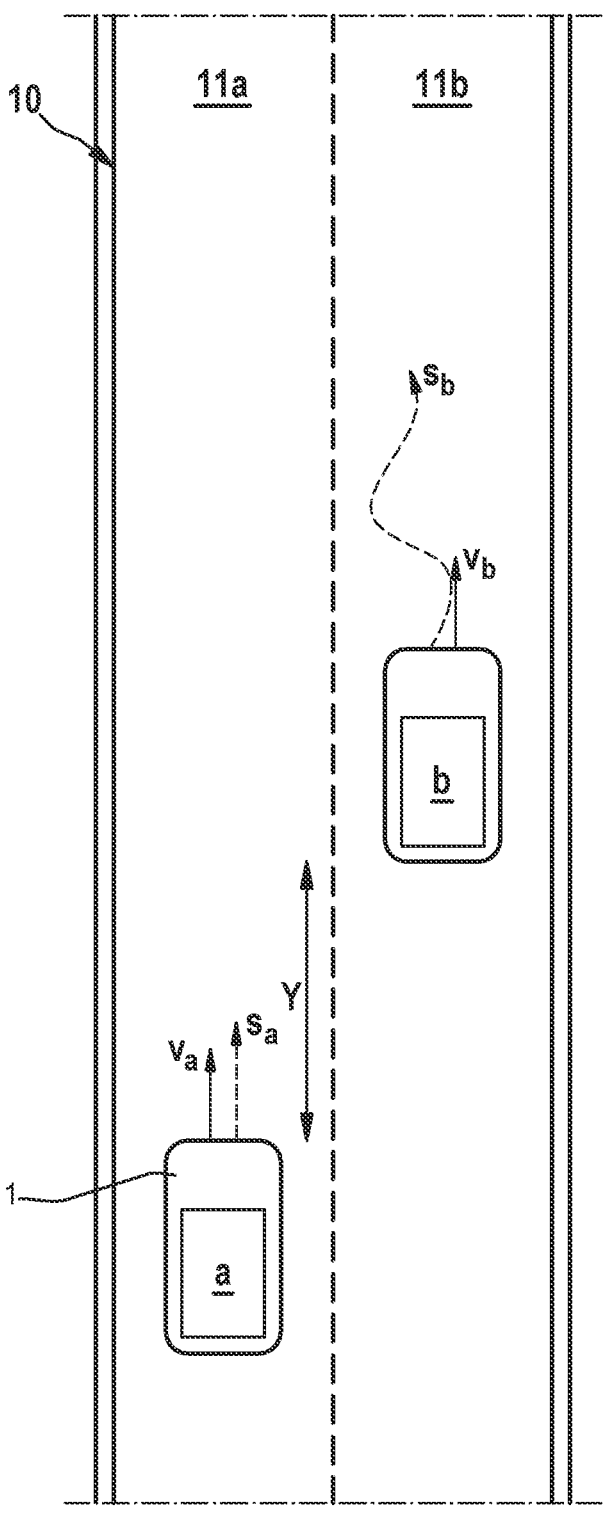

FIG. 3 is a schematic representation of an embodiment of the present invention in a third environment and traffic situation. Here, reference is essentially made to the comments relating to FIG. 2. The differentiating feature is that the risk situation does not result from narrowed lanes or from the width of the vehicle b in the lane 11b, but instead in particular from the driving profile of the vehicle b. Here, a winding driving trajectory s a is shown, which represents a driving movement that is not in a straight line. One reason for this can be the driver being temporarily distracted, or even an ongoing medical emergency. In all cases, a movement profile of this kind represents the possibility of a sudden lane departure or a lane change, and therefore a risk of an accident if the motor vehicle 1 were alongside the vehicle b in this situation. The decision is therefore again made to adapt the automatic longitudinal control and to implement this as already explained in relation to FIG. 2.

Figure 4:
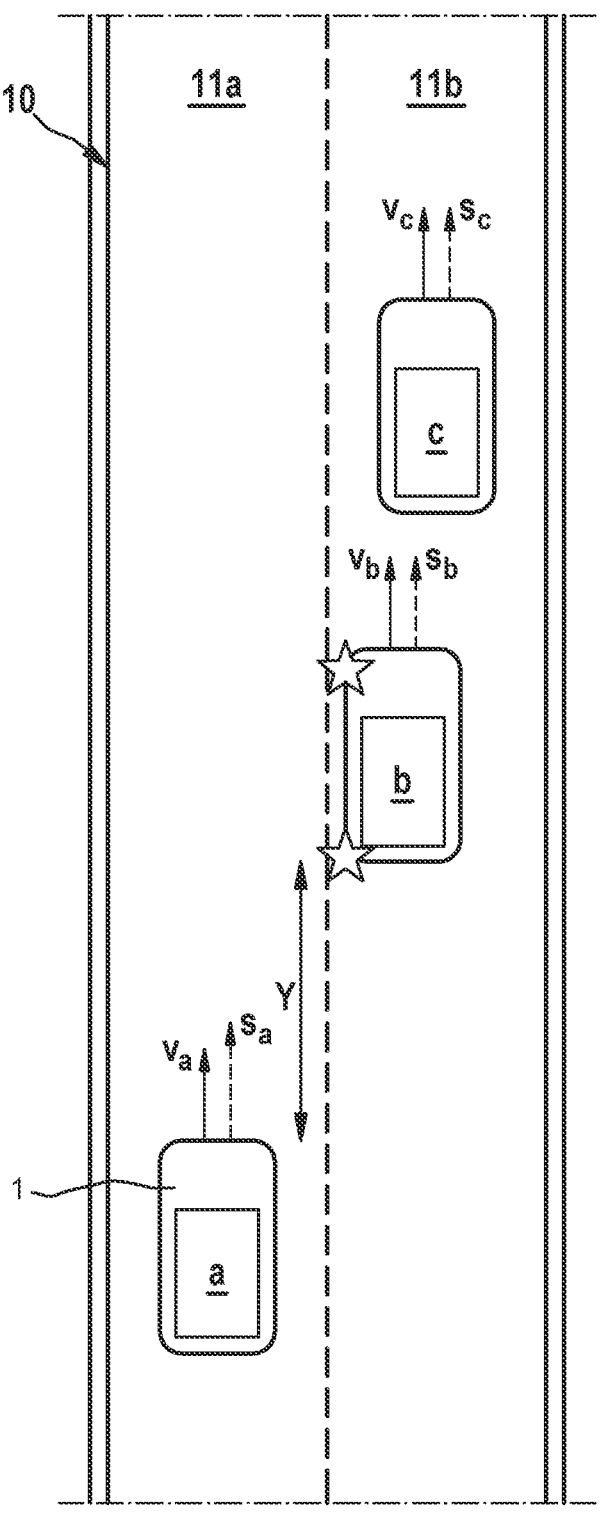

FIG. 4 is a schematic representation of an embodiment of the present invention in a fourth environment and traffic situation. The distinguishing feature in this situation is that, on the basis of the indicator of the vehicle b being turned on and the current position of the vehicle b on the left-hand edge of the right-hand lane, an immediate lane change has to be expected. In order to increase the safety of the motor vehicle 1, even in this situation, i.e., even though the vehicle has not yet actually initiated a lane change, an imminent lane change should be anticipated and taken into account in the longitudinal control of the motor vehicle 1. The decision is therefore again made to adapt the automatic longitudinal control and to implement this by using the vehicle b as a reference point for setting the safety distance Y relative to the motor vehicle 1. Since the speed $V_a$ of the motor vehicle 1 is higher than the speed $V_b$ of the motor vehicle b, the speed $V_a$ of the motor vehicle 1 needs to be reduced immediately so that the defined safety distance relative to the vehicle b can be maintained.

Figure 5:
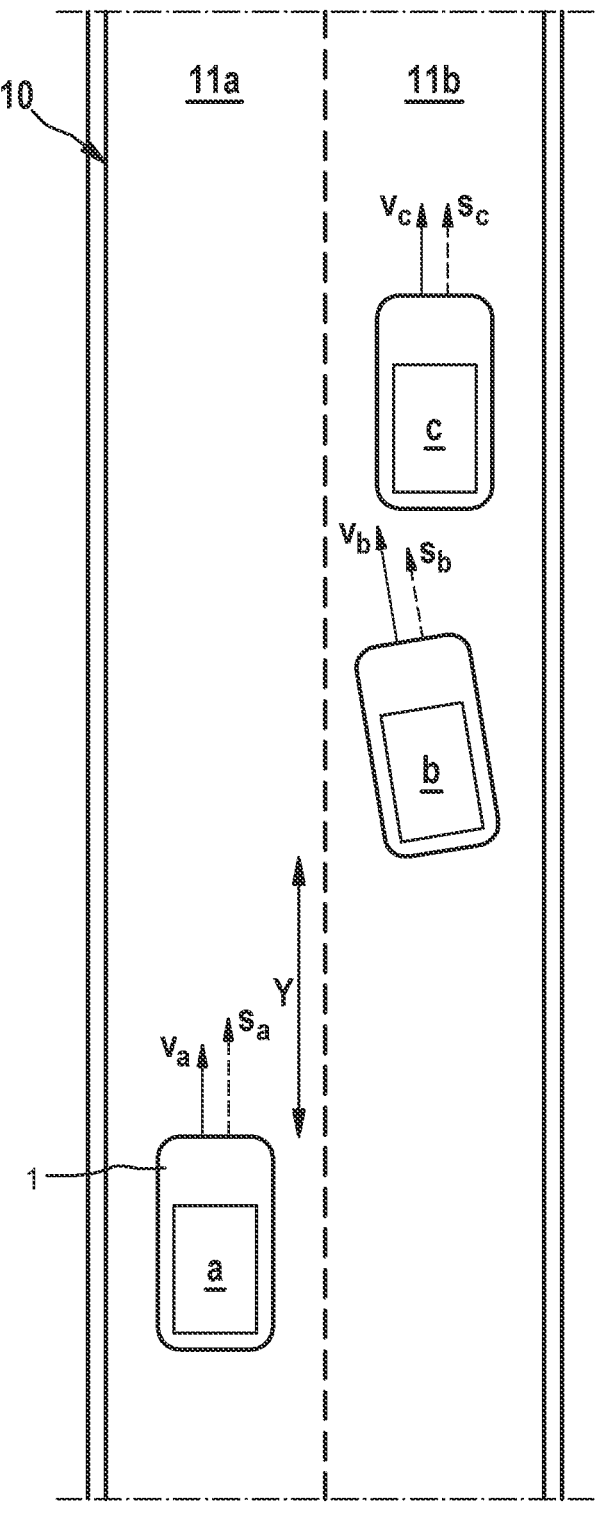

FIG. 5 is a schematic representation of an embodiment of the present invention in a further environment and traffic situation. By contrast with the situation in FIG. 4, a straight-line driving trajectory of the vehicle b is already ascertained here, which, when extrapolated, signals a lane change from the adjacent lane 11*b* to the current lane 11*a*. Since the current distance between the motor vehicle 1 and the vehicle b is less than the defined safety distance Y for the motor vehicle 1, a reduction in the speed of the motor vehicle 1 needs to be initiated immediately. However, it is ascertained that the current speed of the vehicle b is higher than the relative maximum speed at which the motor vehicle 1 is currently driving. In view of this, it is ascertained that the breach of the set safety distance when the vehicle b potentially changes lanes does not actually represent a risk situation for the motor vehicle 1, since, even if vehicle b does change lanes, there will be no potential collision region between that vehicle and the motor vehicle 1. Instead, owing to the difference in speed, the safety distance which has been breached will gradually reset to the intended safety distance Y. In this case, although the longitudinal control is adapted, a speed reduction can be deferred until a lane change is actually made and as long as there is a positive difference in speed during an actual lane change and this difference in speed is maintained.

Figure 6:
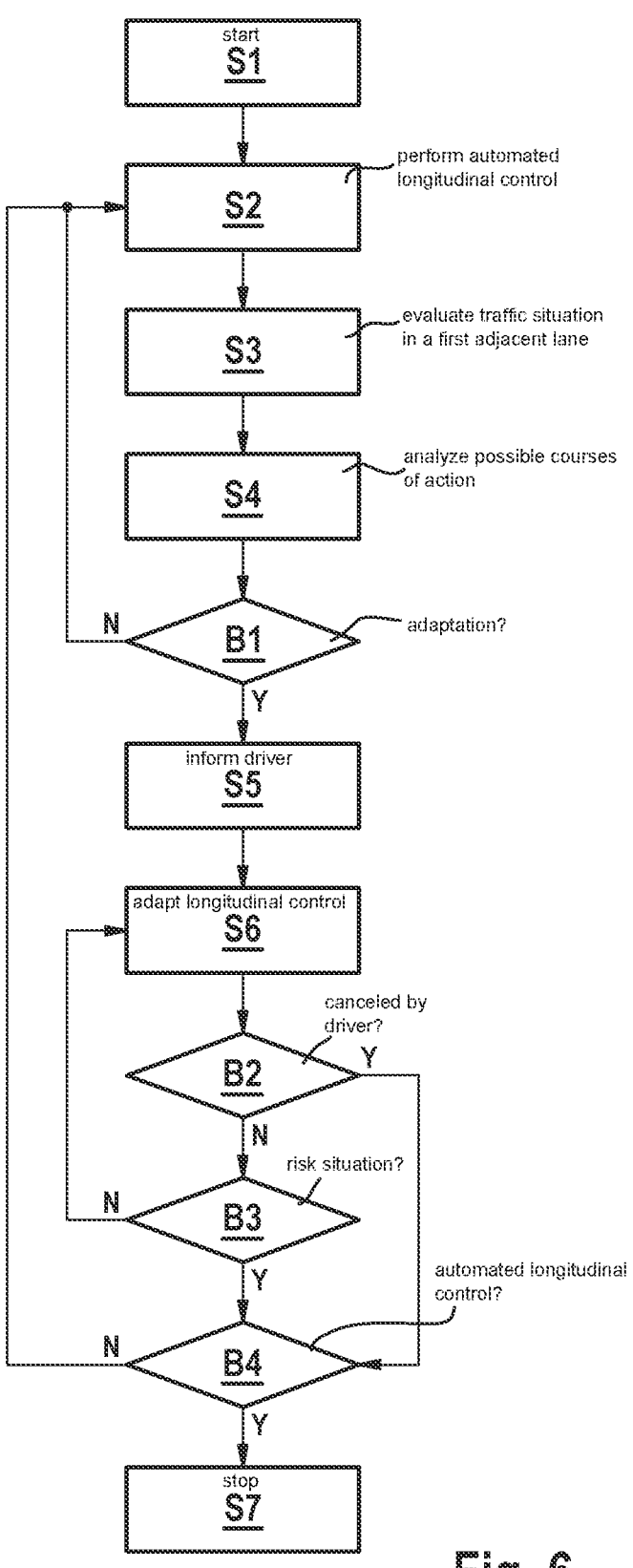
FIG. 6 is a representation of the method steps of a specific example embodiment of the present invention.

FIG. 6 is a representation of the method steps of a specific embodiment of the invention. In a first step S1, the method is started. In a step S2, the automated longitudinal control of the motor vehicle 1 in the first lane is performed. For example, the automated longitudinal control is activated by the driver of the motor vehicle. The automated longitudinal control controls the speed of the motor vehicle in accordance with the traffic situation toward a relative maximum speed predetermined by the driver. Alternatively or additionally, a speed limit for the relevant section of road can also limit the relative maximum speed. In a step S3, the traffic situation in a first adjacent lane to the motor vehicle is evaluated in order to ascertain a risk situation in relation to the motor vehicle in the first lane. In the next step S4, possible courses of action for the motor vehicle are analyzed. In particular, specific environmental aspects are ascertained and are assessed for whether a defined alternative driving maneuver is possible. By way of example, the traffic situation in an alternative adjacent lane is ascertained and assessed in relation to a possible lane change of the motor vehicle. In a subsequent condition B1, a decision is made on adapting the current longitudinal control. If an adaptation is decided upon (Y branch), the driver is informed in the next step S5. The driver can be informed acoustically and/or visually and/or haptically. In a further step S6, the longitudinal control is adapted, for example by reducing the relative maximum speed or by setting a safety distance relative to a vehicle in the adjacent lane. It should be noted here that steps S5 and S6 can of course be performed in parallel with one another. The driver still always has the option of canceling or overriding the adaptation by intervening in the system, as represented in condition B2. If, however, it is not canceled by the driver (N branch), the adaptation is performed for as long as there is a risk situation. This is monitored by condition B3. The risk situation can be ascertained to have ended (Y branch) if it is identified that, for example, the driving behavior of the road user in the adjacent lane has changed, or, for example, if the motor vehicle has been able to brake in order to avoid a possible collision region in the first lane. In such a case, a condition B4 is used to check whether the automatic longitudinal control has ended. If this is not the case (N branch), the automatic longitudinal control continues to be performed in step S2. If, however, this is the case (Y branch), the method ends at step S7.

What is claimed is:

1. A method for operating a driver assistance system for automated longitudinal control of a motor vehicle in a current lane, the method comprising the following steps:

performing automated longitudinal control at a relative maximum speed taking into account a traffic situation in the current lane of the motor vehicle;

evaluating a traffic situation in an adjacent lane to the motor vehicle;

ascertaining a risk situation for the motor vehicle taking into account the traffic situation in the adjacent lane, wherein, for ascertaining the risk situation, an alternative driving maneuver of the motor vehicle is evaluated, and wherein, for evaluating the alternative driving maneuver of the motor vehicle, a check is made as to whether a lane change maneuver to a different adjacent lane is possible; and adapting the automated longitudinal control to resolve the risk situation, the adaptation including reducing the relative maximum speed.

2. The method as recited in claim 1, wherein, for ascertaining the risk situation, performing at least one of the following steps:

evaluating a passive movement model of the motor vehicle;

evaluating an active movement model of the motor vehicle;

evaluating a roadway model;

evaluating an influence of the traffic situation in the adjacent lane on the traffic situation in the current lane; and evaluating coincidence between a risk region and a predicted movement of the motor vehicle in the current lane.

3. The method as recited in claim 1, wherein, for evaluating the traffic situation in the adjacent lane, performing at least one of the following steps:

evaluating a passive movement model of a vehicle in the adjacent lane; and evaluating an active movement model of a vehicle in the adjacent lane.

4. The method as recited in claim 2, wherein, for evaluating the influence of the traffic situation in the adjacent lane on the traffic situation in the current lane, performing at least one of the following steps:

evaluating a potential reduction in a width of a navigable part of the current lane;

evaluating a potential lane departure and/or lane change of a vehicle from the adjacent lane into the current lane;

evaluating a potential breach of a minimum safety distance by the motor vehicle from a vehicle traveling in front of the motor vehicle in the current lane.

5. The method as recited in claim 2, wherein, for evaluating the coincidence between the risk region and the predicted movement of the motor vehicle in the current lane, performing at least one of the following steps:

evaluating a static risk region including a specific course of the roadway and/or a defined roadway width;

evaluating a dynamic risk region including a predicted region in relation to the motor vehicle in the current lane overtaking a vehicle in the adjacent lane which is at least jointly responsible for the risk situation.

6. The method as recited in claim 1, wherein the adaptation includes adjusting the longitudinal control of the motor vehicle in the current lane from being related to a vehicle traveling in front of the motor vehicle in the current lane to being related to a vehicle in the adjacent lane.

7. The method as recited in claim 1, wherein the adaptation includes adjusting the longitudinal control of the motor vehicle in the current lane from a safety distance relative to a vehicle traveling in front of the motor vehicle in the current lane to a safety distance relative to a vehicle in the adjacent lane.

8. The method as recited in claim 1, wherein the relative maximum speed is reduced only when the relative maximum speed of the motor vehicle is higher than a speed of the vehicle in the adjacent lane.

9. The method as recited in claim 1, further comprising:

adjusting the relative maximum speed of the motor vehicle after resolving the risk situation;

continuing the automated longitudinal control of the motor vehicle in the current lane.

10. A device configured to operate a driver assistance system for automated longitudinal control of a motor vehicle in a current lane, the device configured to:

perform automated longitudinal control at a relative maximum speed taking into account a traffic situation in the current lane of the motor vehicle;

evaluate a traffic situation in an adjacent lane to the motor vehicle;

ascertain a risk situation for the motor vehicle taking into account the traffic situation in the adjacent lane, wherein, for ascertaining the risk situation, an alternative driving maneuver of the motor vehicle is evaluated, and wherein, for evaluating the alternative driving maneuver of the motor vehicle, a check is made as to whether a lane change maneuver to a different adjacent lane is possible; and adapt the automated longitudinal control to resolve the risk situation, the adaptation including reducing the relative maximum speed.

11. A non-transitory computer-readable medium on which is stored a computer program operating a driver assistance system for automated longitudinal control of a motor vehicle in a current lane, the computer program, when executed by a computer, causing the computer to perform the following steps:

performing automated longitudinal control at a relative maximum speed taking into account a traffic situation in the current lane of the motor vehicle;

evaluating a traffic situation in an adjacent lane to the motor vehicle;

ascertaining a risk situation for the motor vehicle taking into account the traffic situation in the adjacent lane, wherein, for ascertaining the risk situation, an alternative driving maneuver of the motor vehicle is evaluated, and wherein, for evaluating the alternative driving maneuver of the motor vehicle, a check is made as to whether a lane change maneuver to a different adjacent lane is possible; and adapting the automated longitudinal control to resolve the risk situation, the adaptation including reducing the relative maximum speed.

* * * * *